W. W. DINGEE.
Improvement in Thrashing-Machines.
No. 132,203. Patented Oct. 15, 1872.
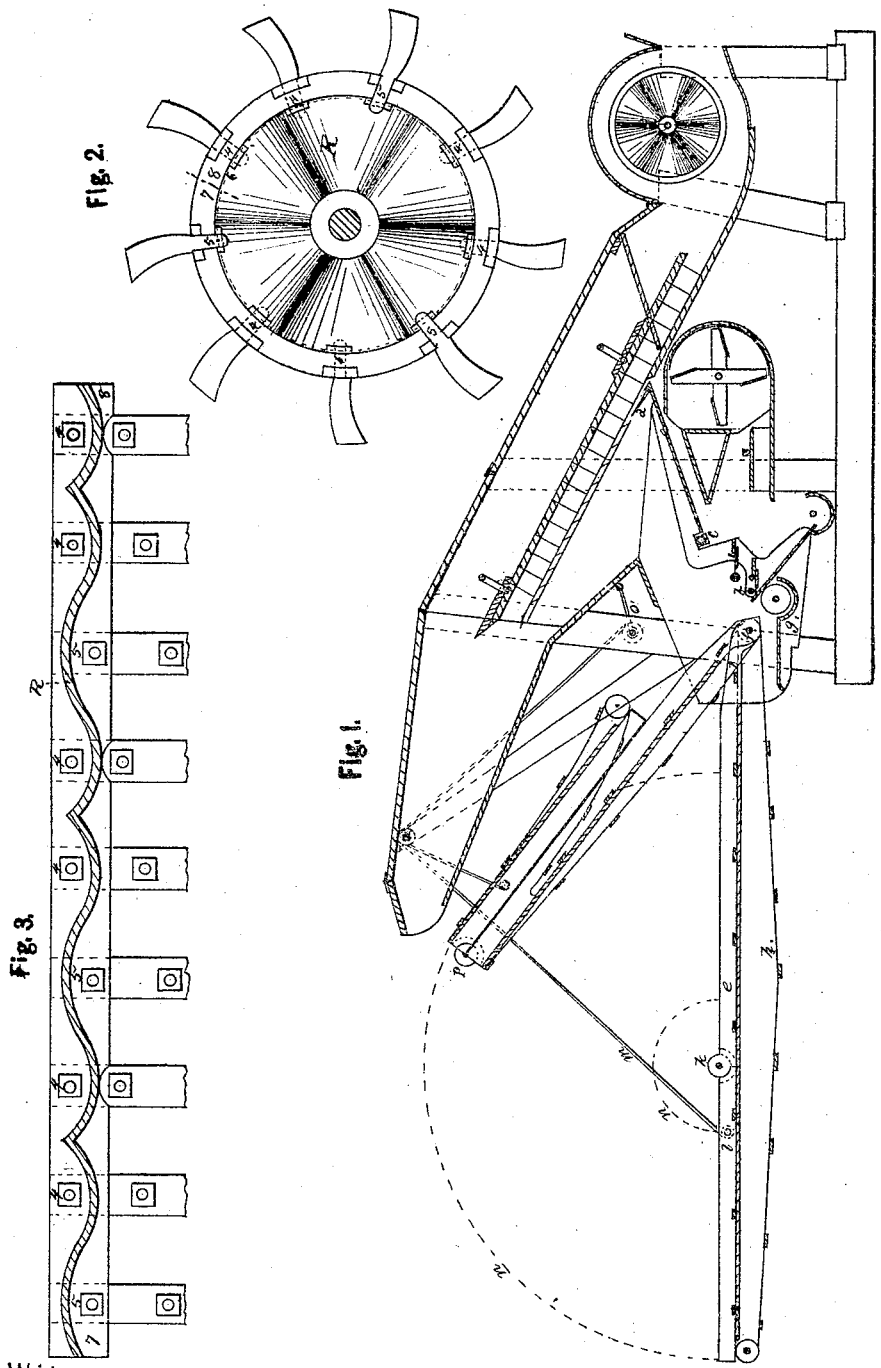
Witnesses:
Lorenzo James
M. P. Dingee
Inventor:
William W Dingee

UNITED STATES PATENT OFFICE.

WILLIAM W. DINGEE, OF RACINE, WISCONSIN.

IMPROVEMENT IN THRASHING-MACHINES.

Specification forming part of Letters Patent No. 132,203, dated October 15, 1872.

*To all whom it may concern:*

Be it known that I, WILLIAM W. DINGEE, of Racine, in the county of Racine and State of Wisconsin, have invented a new and useful Improvement in Machines for Thrashing and Separating Grain; and I do hereby declare that the following is a full, clear, and exact description of the construction and operation of the same, reference being had to the annexed drawing making a part of this specification.

Figure 1 is a vertical section of the thrasher and separator with straw-stacker attached. The stacker is shown in two positions, as used when at work and as folded for transportation. Fig. 2 shows the cylinder-head with cylinder bars and teeth in their places. Fig. 3 shows the rim of cylinder-head with center-plate removed and rim cut and straightened out so as to show the position of center-plate with reference to nuts that secure cylinder-teeth.

In Fig. 1, $a$ is the shoe of fan, hinged at $b$ to the side of fan. $c$ is square end of a shaft, on which shoe $a$ rests, and from which the shoe receives a vertical jarring motion when the shaft $c$ revolves. $d$ is a set of wire fingers, attached to the shoe $a$ at the upper end, and which fingers form a part of the open grate-work, over which the straw is raked and through which the grain and chaff fall upon the shoe; the fingers, being attached to the shoe, partake of its shaking motion, and as the straw passes over them they assist in separating the grain from it. $e$ is the straw-stacker, hinged to its driving-shaft $f$, having a position above the tailing-trough $g$ so as to discharge waste grain from the stacker into the tailing-trough $g$. $h$ is the ordinary revolving carrier, with slats for carrying off the chaff and straw. $i$ is a portion of the lower end of the bottom of the stacker, made of sieve-wire or other open work that will allow any grain blown on it to fall through and be caught by the tailing-trough $g$, from which it is taken back to the thrasher by a screw conveyer and elevator. $k$ is a hinge in the stacker, and $l$ the point of attaching the sustaining-ropes $m$ by a ring in the end of the rope and a pin in the side of the stacker; this allows the outer end of the stacker to be folded in on top of the lower end without removing the carrier $h$ or ropes $m$, as shown by dotted lines $n\ n$. In this position it is raised by ropes $m$ and windlass $o$, and is secured for transportation, as shown at $p$.

In Fig. 2, R is the center-plate of cylinder-head. The nuts of teeth 4 4 4 4 4 4 are on one side of center-plate R and 5 5 5 on the other, the center-plate pursuing a zigzag course so as not to interfere with turning of nuts 4 and 5. The union of center-plate R with inner circumference of rim of cylinder-head is shown in Fig. 3, in which the center-plate R, Fig. 2, is cut out at dotted line 6 and rim cut between numbers 7 and 8, and represented as straightened out. Fig. 3 also shows a portion of each cylinder-bar with teeth and nuts in place. By this formation of plate R the cylinder-heads of a bar-cylinder, in which the teeth are secured by nuts, may be made with a solid plate without the plates interfering with turning the nuts of the cylinder-teeth.

It is necessary to run the cylinder of a thrashing-machine at a high speed, and a cylinder made with plate or solid heads requires less power to run it than if made with spoke-heads, as the latter accumulate dust and straws and present a greater resisting-surface to the air.

What I claim as my invention, and desire to secure by Letters Patent, is—

1. The folding straw-stacker when the folding section is arranged to fold over on top of the main section attached to the thrasher, substantially as and for the purpose described.

2. In combination with a bar-cylinder in which the thrashing-teeth are secured by nuts, I claim the solid heads R when constructed with corrugations, as described and shown, for the purpose set forth.

WILLIAM W. DINGEE.

Witnesses:
L. JANES,
M. P. DINGEE.